Sept. 10, 1963  W. H. HAWKINS  3,103,064
APPARATUS FOR REMOVING BEARINGS FROM AXLES AND THE LIKE
Filed March 10, 1959  2 Sheets-Sheet 2

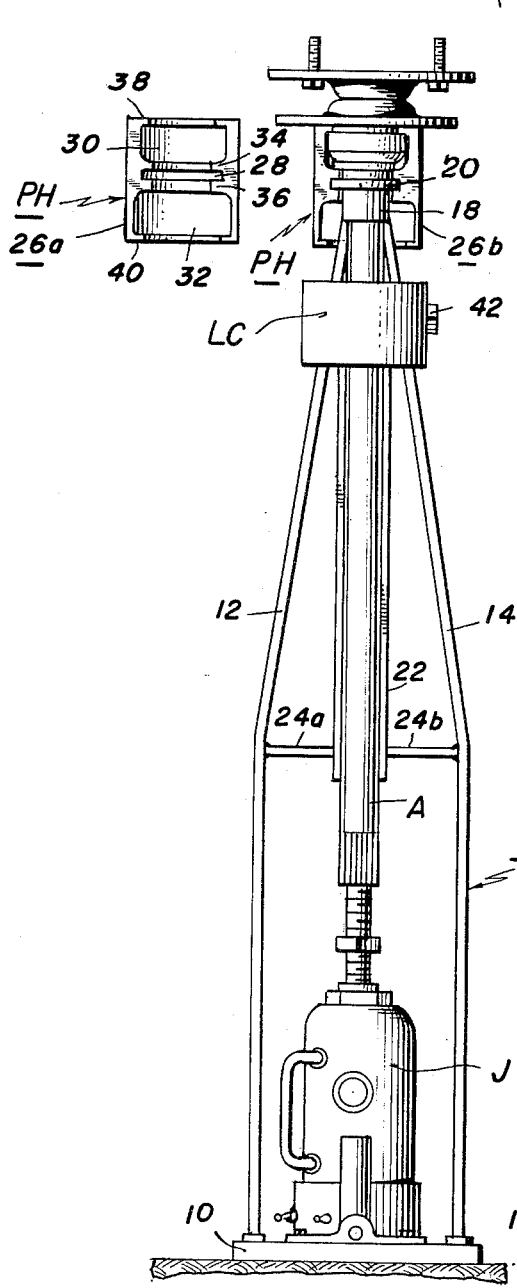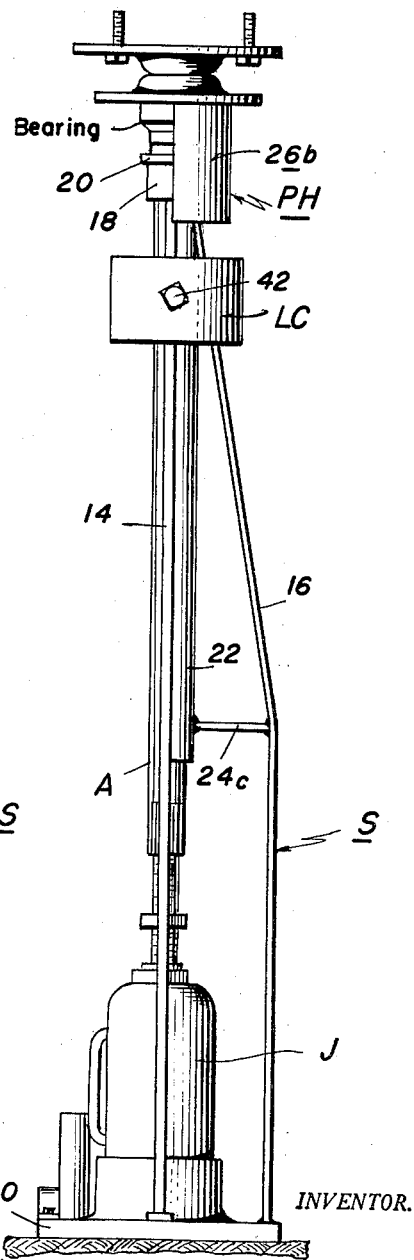

INVENTOR
WALLACE H. HAWKINS

BY
ATTORNEY

United States Patent Office 3,103,064
Patented Sept. 10, 1963

3,103,064
APPARATUS FOR REMOVING BEARINGS FROM AXLES AND THE LIKE
Wallace H. Hawkins, Panama City, Fla., assignor to Red Arrow Tow Bar Mfg., Inc., Panama City, Fla.
Filed Mar. 10, 1959, Ser. No. 798,479
5 Claims. (Cl. 29—252)

This invention relates to improvements in apparatus for removing bearings from and replacing them on axles and shafts, usually automobile rear axles, and more particularly to an improved so-called bearing puller for removing and replacing an axle-mounted bearing through the use of power jacking means providing the mechanical force to press the axle through the bearing as effects the desired bearing removal or replacement.

While bearing pullers are known, such have been found in practice to be lacking in effectiveness in one or more important respects. For example, in at least one form of prior bearing puller in use, no provision was made for insuring concentricity of axle, bearing and power jack means during pulling of the bearing, as is advisable if not necessary for effective bearing removal. Another objection found to be present in most prior bearing pullers was their inability to take all makes and sizes of bearings used in passenger automobiles and small pick-up trucks of American manufacture, with the result that, while a particular bearing puller may be used with one make or size bearing, it is not suited to the pulling of other makes and sizes of axle-mounted bearings. Again, while one manufacturer's bearing puller may be effective for pulling a complete bearing, i.e. both the inner and outer races making up the conventional axle bearing, it is not designed to fit only the inner race of a bearing whose outer race is missing, for example.

Stated generally, a principal object of the invention is the provision of a so-called bearing puller which overcomes the above-noted objections present in the prior devices serving similar function with which I am familiar, in thoroughly dependable and effective yet simple manner.

More particularly, it is a major object of the present invention to provide a bearing puller constructed and arranged so as to insure concentricity of axle, bearing, and jack means during the bearing pulling operation.

Another equally important object of the invention is the provision of a bearing puller whose construction and operation are sufficiently flexible as to enable it to pull (remove) the whole range of bearing makes and sizes which are presently used in passenger automobiles and pick-up trucks of American manufacture.

Still another object of the invention is the provision of a bearing puller as aforesaid which may also be adapted to the pulling of the inner race of a bearing whose outer race or section has become separated or is missing.

A further object of the invention is the provision of a bearing puller so constructed and arranged that the bearing being pulled is fully enclosed during the pulling operation, thus protecting the user against the possibility of the bearing exploding under the high pressure sometimes necessary to effect its pulling and further offering protection to the bearing itself against bursting or damage due to being cocked sideways during the pulling operation.

Yet another and very practical object of the invention is the provision of a bearing puller satisfying all of the aforesaid desirable aims and which additionally may be usefully employed in pressing a bearing back on to its axle.

The above and other more specific objects of a bearing puller according to the invention will appear from the following detailed description thereof, in which reference is made to the accompanying illustrative drawings, wherein:

FIG. 1 is a front elevation of a preferred form of bearing puller according to the invention which shows an axle mounted in the puller stand thereof preparatory to removal of a bearing affixed therein, the view illustrating one part (half) of the reversible, sectional puller head constituting an important feature of the invention fitted to said bearing and the other part separated therefrom, and further showing the head-part locking collar in an inactive position;

FIG. 2 is a side elevation of the bearing puller shown in FIG. 1 which omits the puller-head part which was separately shown in said latter view;

Figure 4:
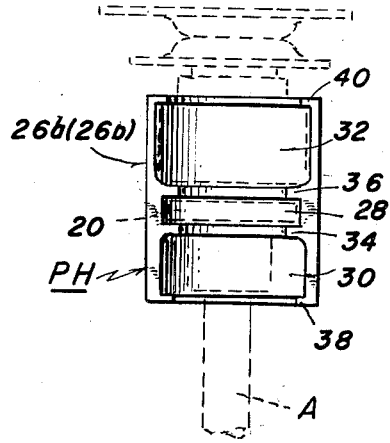
FIG. 4 is an enlarged detail view showing one part of the basic puller head in a reversed position as compared to its FIG. 1 position as enables the puller head to take a larger size bearing shown in broken lines.
Figure 5:
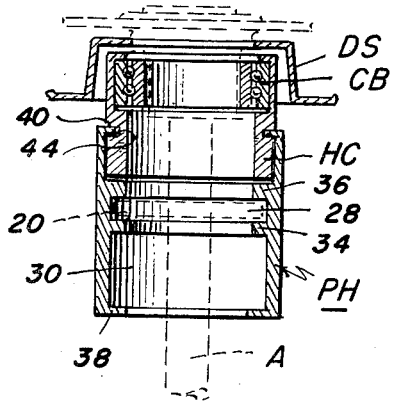
Figure 6:
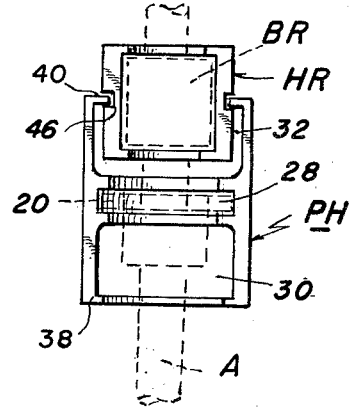

FIG. 5 is a broken-away front elevational view of the upper portion of the puller shown in FIG. 1 set up to pull a bearing from the axle of a Chevrolet passenger automobile, through the use of a specially designed adapter head cooperated with the aforesaid basic puller head; and FIG. 6 is a view similar to FIG. 4 illustrating the manner of using the reversed basic puller head according to FIG. 4 to pull a bearing inner-race whose outer race is missing, in cooperation with another form of adapter head designed to fit said inner race.

Referring to the drawings, a so-called bearing puller according to the invention illustratively comprises an axle stand generally designated S for mounting an axle whose bearing is to be pulled (removed) from said axle; a sectional puller head generally designated PH serving to immovably secure the bearing to the stand as the axle is being pressed therethrough; a locking collar LC for locking the sections of the puller head together so that they form an operative head structure; and a power jacking means J for applying an axial force to the axle in direction as to press or force same through the bearing held by the puller head. As will be hereinafter discussed in detail, the puller head PH is designed to fit (because of its double-ended, reversible construction) the bearings used in all makes and models of passenger automobiles and pick-up trucks of American manufacture excepting Chevrolet passenger cars, for which the invention provides a specially designed adapter head HC to be used in conjunction with the basic puller head PH. Preferably also, there is provided a second adapter head HR designed to fit the inner race of a bearing whose outer race has become separated therefrom or is missing altogether, such to be similarly used in conjunction with the basic puller head PH.

As best seen in FIG. 1, the axle stand S comprises a circular base 10 mounting a plurality of (illustratively three) upright frame members 12, 14 and 16 of heavy rod or bar stock whose upper ends are affixed to and rigidly mount a vertically disposed sleeve 18 preferably formed with a heavy radial ring flange 20 extending flush with its upper edge, said flange, as will be explained hereinafter, forming both an elevated bearing rest and a puller head-to-axle stand anchoring ring. The frame members are arranged two at the sides and one at the rear of the base, thus to leave the front side of the stand open as provides ready access to an axle mounted in the stand for bearing removal. As shown, the lower end portions of the upright members 12, 14, 16 are arranged in parallel whereas their upper end portions converge towards one another to engage with the sleeve 18 and thus the upright members form in effect a tripod support therefor.

Secured at its upper end to the sleeve 18 and extending downwardly in vertical continuation thereof is a preferably open front tube 22, i.e. a semi-cylindrical tube open at its front, which serves to vertically cradle and thereby stabilize, and also to guide, an axle moving axially upwardly therealong during bearing removal and similarly during bearing replacement as will be described. The aforesaid tube terminates at its lower end well above the base 10 and its said lower end is held centered with the sleeve 18 and its flange 20 by cross arms 24a, 24b which also serve as cross braces for the upright side members 12, 14. The space between the lower end of the tube 22 and the base provides for the positioning therein of the power jack J which is adapted to be centered with the axle extending through sleeve and tube and thereupon to apply a force in upward direction thereto. The jack being conventional, the details thereof are not herein set forth, but it may be observed that a hydraulically operated jack fed from a suitable source of hydraulic pressure is preferred for its certain and speedy operation.

According to the present invention, the aforesaid basic puller head PH, which is formed as a thick-walled tubular cylinder, is of sectional construction, being preferably made up in two identical half sections 26a, 26b adapted to be brought together and closed about the sleeve flange 20 and a bearing to be pulled which has been lowered thereon by movement of its axle, bearing end up, through the sleeve 18 and its aforesaid flange, the axle thus being mounted in the stand generally as illustrated in FIGS. 1 and 2, for example. Preferably also, the puller head PH is of reversible construction so that either end thereof may be closed on a bearing to be pulled. Thus, by fitting one end of the puller head to one size of bearing and the other end to another size of bearing, the puller head is adapted to pull or remove two different size bearings.

More particularly, the bore of the puller head sections 26a, 26b is specially configured, as by a machine operation or by casting said sections in their entirety, to provide in its middle length portion an annular groove or channel 28 of depth and width such that it is adapted to fit, i.e. form a substantially exact matrix or impression of, the flange 20; and to provide in one end section a chamber or recess 30 of diameter and depth such that it is adapted to similarly fit the smaller of the two sizes of bearings used on rear axles of the various makes of passenger automobiles and pick-up trucks of American manufacture, and also to provide in the other end portion of the bore a chamber or recess 32 similarly fitted to the larger size of axle bearings used as above. To provide the puller head with means whereby it may be secured to the axle stand S, the head-bore chambers 30, 32 are spaced a small distance axially from the flange groove 28 by circularly extending internal ribs 34, 36, the lower one of which will always move in under the aforesaid anchoring flange or ring 20 with proper positioning and closing of the puller head. It is also to be noted that the end walls of the puller head are formed as inwardly directed flanges 38, 40, which are adapted to extend inwardly over the upper end face of a bearing contained in the chamber 30 or 32 immediately adjacent thereto, thus to secure said bearing to the stand against upward movement with its shaft or axle when upward force is applied to the latter when pulling the bearing. Thus it will be clear that the puller head half-sections 26a, 26b form a demountable reversible puller head which may be coupled to the aforesaid sleeve or anchoring flange 20 and hence to the axle stand proper in position such that a selected one of its bearing-receiving chambers 30, 32 is upwardly disposed, thus to receive and coupled to the stand a bearing then resting on said flange to which said upwardly disposed chamber is fitted.

Figure 3:
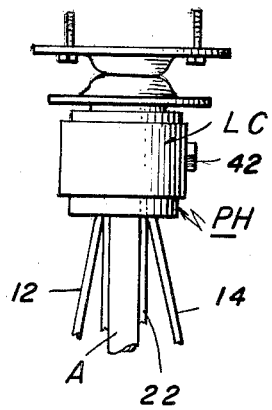
FIG. 3 is a broken-away front elevational view of the upper portion of the bearing puller shown in FIG. 1 but illustrating the puller head closed on a bearing to be removed by the headpart locking collar now in its active position.

The aforesaid locking collar LC provides the means for securing the puller head half-sections 26a, 26b together and also to mount the closed puller head to the stand. As seen in FIGS. 1 and 2, the locking collar, which will be understood has a bore of diameter such that it is adapted to closely fit about the puller head half sections when the latter are brought together and closed one on the other, has a normally inactive position substantially below the sleeve 18 in which it is supported by the upright members 12, 14 and 16. Upon closing of the puller head half sections about a bearing resting on the sleeve flange 20 as aforesaid, the locking collar is adapted to be manually raised to its FIG. 3 position in which it encircles the now closed puller head thereby to lock the latter coupled to the flange and fitted to the bearing resting thereon. A quick-acting set screw or like means 42 carried by the locking collar may be provided to affix same against unintentional movement upon the locking collar having been moved to its active or locking position.

In addition to the aforesaid basic puller head PH serving, upon reversal, to pull the two sizes of bearings employed as axle bearings in all makes of passenger automobiles and pick-up trucks of American manufacture excepting those of Chevrolet manufacture, it may also be usefully employed, in conjunction with supplemental heads designated adapter heads HC and HR above, to pull the bearings of Chevrolet axles and also to pull the inner races of bearings regardless of vehicle make whose outer races are missing. Referring to FIG. 5, illustrating the basic puller head PH and one form of adapter head HC set up to pull a bearing CB of Chevrolet passenger-automobile rear axles which, as is well known, are characterized by an inwardly extending dust cover or shield DS closely fitted around the bearing, it will be observed that the puller head is disposed with its larger bearing chamber 32 opening upwardly. The adapter head HC has external diameter enabling it to be accommodated within both said larger chamber and said dust shield and its upper-end portion which is adapted to extend upwardly from the puller head into the dust shield, has a bore which is internally sized and contoured to closely fit over the bearing to be pulled. Said puller head HC is also provided in its external surface with a circular groove 44 into which the inwardly directed end flange 40 of the puller head is adapted to project, thereby to positively lock the adapter head HC to said basic puller head. It is to be understood that the adapter head HC, like the main or basic puller head, is also made up in identical half sections as enables a puller head half section to be readily coupled to an adapter head HC half section, and thereupon the half sections to be closed on the sleeve flange 20 and upon a bearing received in the adapter-head bore and finally secured together by the aforesaid locking collar LC, as results in the bearing being held to said sleeve flange and hence to the stand as a whole for subsequent pressing of the axle therethrough.

Referring to FIG. 6, such shows the basic puller head PH and adatper head HR set up to pull the inner race BR of a bearing whose outer race is missing due to accident or otherwise. It will be noted that said adapter head, whose bore is internally sized and contoured to fit said inner bearing race, is also partially accommodated within the larger bore chamber 32 of the puller head PH and it is similarly held thereto by virtue of the puller head end flange 40 fitting into a circular groove 46 provided in its external periphery. Thus, the bearing puller of the invention is convertible to the pulling of an inner bearing race of a bearing with the same effectiveness as in pulling a complete bearing.

The operation of a bearing puller as aforesaid can be briefly summarized as follows: With the puller head PH demounted from the stand S and the locking collar LC in its lowered or inactive position, a bearing to be removed is engaged on the sleeve flange 20 providing a rest or support therefor by inserting the axle carrying the bearing, through the flange and sleeve and permitting same to lower until the bearing rests on said flange. Assuming that the bearing to be pulled will fit either of the puller head bore chambers 30, 32, the puller head sections properly turned are brought together so as to close on the sleeve flange 20 and bearing resting thereon (such requiring that the bearing be raised slightly from said flange as to permit the inactive coupling rib 34 or 36 to move in under said bearing) and thereupon the locking collar LC is moved to its active or locking position in which it maintains the bearing sections closed as aforesaid, such resulting in the bearing being now immovably held to the sleeve flange 20 now functioning as an anchoring flange and hence to the stand S by the active puller-head coupling flange 34 or 36 and the correspondingly active end-wall flange 38 or 40. Thereupon the jacking means J is moved into position such that its end is axially aligned with the lower or splined end of the shaft. Upon the jacking means being activated, it presses the axle upwardly through the bearing, during which operation concentricity of the axle and its bearing with the jack means is positively maintained, due to the centering and guiding effect exercised by the sleeve 18, its flange or anchoring ring 20 and its vertically depending guide tube 22, and also the user is protected against bursting of the bearing. Upon completion of this axle-press operation, which of course is such as to insure desired bearing removal (from axle), the locking collar is lowered, the puller head is opened up, and the bearing is removed from the sleeve flange 20 whereupon the stand is ready for the next bearing-pulling operation.

In the event a Chevrolet passenger automobile bearing is to be pulled from its rear axle, the supplemental adapter head HC is coupled to the basic puller head as shown in FIG. 5, whereupon the pulling operation is carried out as just described, the only difference being that the bearing being pulled is encompassed by the adapter head HC rather than by the puller head PH. Similarly, when it is desired to pull an inner bearing race whose outer race is missing, the adapter head HR, coupled to the basic puller head PH as in FIG. 6, is employed to directly grasp and hold said inner race whereupon the pulling operation proceeds as aforesaid.

The above described apparatus may also be usefully employed in mounting a bearing on its axle. In such an operation, the axle with bearing loosely mounted thereon and turned with its bearing end down is inserted upwardly through the sleeve 18 and its flange 20 until the bearing abuts the lower end of the tube 22. With the axle held in such position, the jack means J is moved in under the axle to a position in axial alignment therewith. Upon activation of the jack means, the latter presses the axle upwardly through the held bearing the amount necessary to accurately seat said bearing whereupon the jack means is deactivated and removed and, finally, the axle with bearing replaced is moved downwardly through the sleeve 18 and taken from the stand.

It is also possible to remove roller bearings, for example, from the shafts mounting same by pushing the shaft upwardly through the bearing held against the lower end of the tube 22, as described above for the bearing mounting operation. Thus, a bearing puller or press according to the invention is extremely flexible in its uses and applications.

Without further analysis, it will be appreciated that the above described bearing puller achieves in simple yet effective and thoroughly dependable manner the objectives therefor set forth above. However, numerous changes in carrying out the above constructions appear possible without in any way departing from the spirit and scope of the invention. For example, the internal configuration of the master puller head PH and the supplementary or adapter heads may be varied from that shown; the external surface of the master puller head and/or the complemental bore surface of the locking collar LC may be tapered or otherwise configured to insure full closure of the puller head, and the like. Thus, it is intended that all matter contained in the above description or shown in the accompanying drawings shall be interpreted as illustrative and not in a limiting sense.

I claim:

1. Apparatus for removing bearings from vehicle axles and like workpieces comprising, in combination, a base, an upright axle-supporting stand mounted on said base, a ring-form anchoring flange rigidly affixed to the upper end of the stand and adapted to support by engagement of its bearing thereon a workpiece disposed to extend through said flange with its bearing end up in vertical position and with its other end raised from the ground, a multi-section cylindrical puller head mounted in encircling relation on said flange and adapted to be opened up by removal of one or more of its sections and to be bodily demounted from said flange thereby to facilitate positioning of a workpiece on the stand for bearing removal, said puller head being internally configured so as to substantially match and thereby closely interfit with and embrace both the bearing to be removed and said flange so that when it is assembled about a bearing supported on said flange said puller end is capable of anchoring said bearing to said flange against movement upwardly therefrom, means for detachably securing the sections of the puller head to one another in assembled relation and for similarly detachably coupling said pulley head as a unit to said flange, and jack means positioned on said base beneath the workpiece and being disposed substantially coaxial with the flange and said workpiece supported thereon as aforesaid for pressing the workpiece upwardly through the so anchored bearing.

2. Apparatus as set forth in claim 1, wherein said means for locking said puller head closed comprises a locking ring encircling said head but being movable axially with respect to said head to an inactive position.

3. Apparatus as set forth in claim 1, wherein said cylindrical puller head is reversible with respect to the flange and is internally configured in one end portion to one size of bearing and in the opposite end portion to another size of bearing.

4. Apparatus as set forth in claim 1, wherein the internal configuration of a portion of the puller head fits also same to an adapter member in turn having internal configuration enabling it to fit closely about a different size of bearing or part thereof than that to which the puller head itself is fitted.

5. Apparatus as set forth in claim 1, wherein said puller head is reversible with respect to said flange, in one end portion is internally configured to fit one size of bearing, in its opposite end portion is internally configured to fit another size of bearing, and in its middle-length portion is internally configured to fit said flange.

References Cited in the file of this patent

UNITED STATES PATENTS

| | | |
|---|---|---|
| 778,881 | Mouton | Jan. 3, 1905 |
| 1,438,039 | Hurlbut | Dec. 5, 1922 |
| 1,442,638 | Baxley | Jan. 16, 1923 |
| 1,670,574 | Howell | May 22, 1928 |
| 1,747,689 | Wubbenhorst | Feb. 18, 1930 |
| 1,780,888 | Uebelhoer | Nov. 4, 1930 |
| 1,813,219 | Woernley | July 7, 1931 |
| 2,068,021 | Hamman | Jan. 19, 1937 |
| 2,485,022 | Taylor | Oct. 18, 1949 |
| 2,496,005 | Grant | Jan. 31, 1950 |
| 2,807,080 | Mathews | Sept. 24, 1957 |
| 2,807,081 | Black | Sept. 24, 1957 |